(12) United States Patent
Ahmed et al.

(10) Patent No.: US 7,302,107 B2
(45) Date of Patent: Nov. 27, 2007

(54) JPEG ENCODING FOR DOCUMENT IMAGES USING PIXEL CLASSIFICATION

(75) Inventors: Mohamed N. Ahmed, Louisville, KY (US); Brian E. Cooper, Lexington, KY (US); Michael E. Lhamon, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 796 days.

(21) Appl. No.: 10/744,884

(22) Filed: Dec. 23, 2003

(65) Prior Publication Data

US 2005/0135693 A1 Jun. 23, 2005

(51) Int. Cl.
*G06K 9/36* (2006.01)
(52) U.S. Cl. ............ 382/251; 358/426.14; 375/240.03; 375/240.2; 375/240.22; 382/250
(58) Field of Classification Search ........... 375/240.22, 375/240.03, 240.2, 240.24; 382/239, 250, 382/251, 253, 248; 358/426.14
See application file for complete search history.

(56) References Cited

U.S. PATENT DOCUMENTS

| | | | |
|---|---|---|---|
| 5,465,304 A | 11/1995 | Cullen et al. | |
| 5,535,013 A | 7/1996 | Murata | |
| 5,696,842 A | 12/1997 | Shirasawa et al. | |
| 5,778,092 A | 7/1998 | MacLeod et al. | |
| 5,875,041 A | 2/1999 | Nakatani et al. | |
| 5,883,979 A | 3/1999 | Beretta et al. | |
| 5,886,790 A | 3/1999 | Abe | |
| 5,907,362 A | 5/1999 | Yamamoto | |
| 5,949,964 A | 9/1999 | Clouthier et al. | |
| 5,959,675 A | 9/1999 | Mita et al. | |
| 5,982,937 A | 11/1999 | Accad | |
| 6,014,467 A | 1/2000 | Asano | |
| 6,072,910 A * | 6/2000 | Maeda et al. | 382/253 |
| 6,075,619 A | 6/2000 | Iizuka | |
| 6,198,850 B1 | 3/2001 | Banton | |
| 6,252,994 B1 * | 6/2001 | Nafarieh | 382/253 |
| 6,285,458 B1 | 9/2001 | Yada | |
| 6,307,962 B1 | 10/2001 | Parker et al. | |
| 6,314,208 B1 | 11/2001 | Konstantinides et al. | |
| 6,320,982 B1 | 11/2001 | Kurzweil et al. | |
| 6,330,363 B1 | 12/2001 | Accad | |
| 6,400,844 B1 | 6/2002 | Fan et al. | |
| 6,701,020 B2 | 3/2004 | Chrysafis et al. | |
| 6,862,371 B2 * | 3/2005 | Mukherjee | 382/248 |
| 2001/0043754 A1 * | 11/2001 | Memon et al. | 382/251 |
| 2003/0012444 A1 * | 1/2003 | Inoue et al. | 382/232 |
| 2003/0123740 A1 * | 7/2003 | Mukherjee | 382/239 |
| 2003/0223492 A1 * | 12/2003 | Drezner et al. | 375/240.2 |
| 2005/0135693 A1 * | 6/2005 | Ahmed et al. | 382/251 |
| 2005/0213836 A1 * | 9/2005 | Hamilton | 382/251 |
| 2006/0050881 A1 * | 3/2006 | Ahmed | 380/217 |
| 2007/0036450 A1 * | 2/2007 | Kondo et al. | 382/250 |

* cited by examiner

*Primary Examiner*—Gregory M Desire

(57) ABSTRACT

The invention provides a system and method for JPEG encoding an image that includes variable quantization for each block, depending upon the classification of each block, which is dependent on the classification of pixels in that block.

22 Claims, 2 Drawing Sheets

JPEG ENCODING FOR DOCUMENT IMAGES USING PIXEL CLASSIFICATION

FIELD OF THE INVENTION

The present invention relates generally to compressing image data using the JPEG standard, and specifically, to using a variable quantization table selected for each block according to the classification of pixels in that block.

BACKGROUND OF THE INVENTION

Documents containing both text and pictures, known as compound documents, are becoming more prevalent. Previously, documents often consisted exclusively of text or exclusively of pictures. Pictures, as used herein, refer to photographs, naturalistic artwork, and graphical images or material. Text includes lettering, certain line drawings, and certain patterns. In order to represent compound documents electronically, it is desirable to have the ability to compress the image data corresponding to the document. Compression saves on storage space and allows the data to be more quickly transmitted, whether the purpose is photocopying a document, sending image data to a printer, or saving and sending image data via e-mail or facsimile.

Many different compression algorithms exist, some standard and some proprietary. In general, certain compression algorithms are better suited to text while other compression algorithms are better suited to pictures.

JPEG (Joint Photographic Experts Group) is the name of a committee and the name of the international standard adopted by that committee which applies to compression of graphic images (pictures). The JPEG standard is one of the most popular and comprehensive continuous tone, still frame compression standards. JPEG defines three different coding systems: (1) a lossy baseline coding system, which is based on the Discrete Cosine Transform (DCT); (2) an extended coding system for greater compression and progressive reconstruction applications; and (3) a lossless independent coding scheme for reversible compression. In order to be JPEG compliant, a product or system must include support for the lossy baseline coding system.

Lossy image compression refers to a technique wherein the compressed data cannot be decompressed into an exact copy of the original image, i.e., there is a loss of quality of the final image. An important goal in lossy image compression is to achieve maximum compression while still obtaining high image quality of the decompressed image. In order to provide acceptable image quality in the decompressed image, in general, a greater amount of compression is possible for pictures as compared to text. Too great of a compression amount for text often introduces unacceptable artifacts into the decompressed image.

In the JPEG lossy baseline system, compression is performed in three sequential steps: DCT computation, coefficient quantization, and finally lossless compression.

The image is first divided into non-overlapping blocks of size 8 by 8 pixels, which are processed in an order from left to right, top to bottom. After a normalization step, a two-dimensional DCT is applied to each block. This transform, similar to a Fourier transform, produces a transformed block (matrix) in the frequency domain. The first coefficient (location 0, 0) in the transformed block is a constant that represents the average or DC component of the 64 image elements (pixels) included in each image block. The remaining coefficients describe higher frequencies found in the block.

The DCT coefficients are then quantized using a defined quantization table and reordered using a zigzag pattern to form a one-dimensional sequence of quantized coefficients. Lossless entropy coding, such as Huffman coding, is then applied to the resulting sequence to produce the compressed data.

Although there are a number of settings that can be predefined to achieve different compression ratios, one parameter, called the quality factor, can be adjusted in JPEG compression. The quality factor is a single number in an arbitrary, relative scale and is often adjusted on an image-by-image basis. A higher quality factor will provide a relatively high quality decompressed image, but will require a relatively large file (less compression). A lower quality factor will provide greater compression with a correspondingly smaller file size. However, there may be more visible defects or artifacts in the decompressed image. Generally, pictures can be compressed to a greater degree as compared to text, in order to maintain acceptable decompressed image quality.

U.S. Pat. No. 6,314,208 describes an image compression system that can be used to apply different quantization factors to blocks of picture and text to provide significant image compression. The quantization factors are selected by examining the DCT coefficients in the transformed block and estimating metrics that would indicate the presence of text versus pictures.

SUMMARY OF THE INVENTION

The invention provides a system and method for JPEG encoding an image that includes variable quantization for each block, depending upon the classification of each block, which is dependent on the classification of pixels in that block.

The system includes a pixel classification module for classifying each pixel of the image as one of a plurality of pixel classifications and a block classification module for classifying each defined block of pixels as one of a plurality of block classifications based on the pixel classifications of pixels in the block. A discrete cosine transform calculator operates to produce a transform coefficient for each block. A quantization table selector unit operates to select, for each block, a quantization table according to the block classification of the block. A quantizer quantizes the transform coefficient for each block using the selected quantization table.

The method includes the step of classifying each pixel of the image as one of a plurality of pixel classifications. The image is defined as a plurality of blocks of pixels and each block is transformed to produce transform coefficients for the block. Each block is classified as one of a plurality of block classifications based on the pixel classifications of pixels in the block. A quantization table is selected for each block according to its block classification, and the transform coefficients are quantized for each block using the selected quantization table for that block.

Other features and advantages of the invention will become apparent to those skilled in the art upon review of the following detailed description, claims, and drawings.

DETAILED DESCRIPTION OF THE PREFERRED EMBODIMENTS

Figure 1:
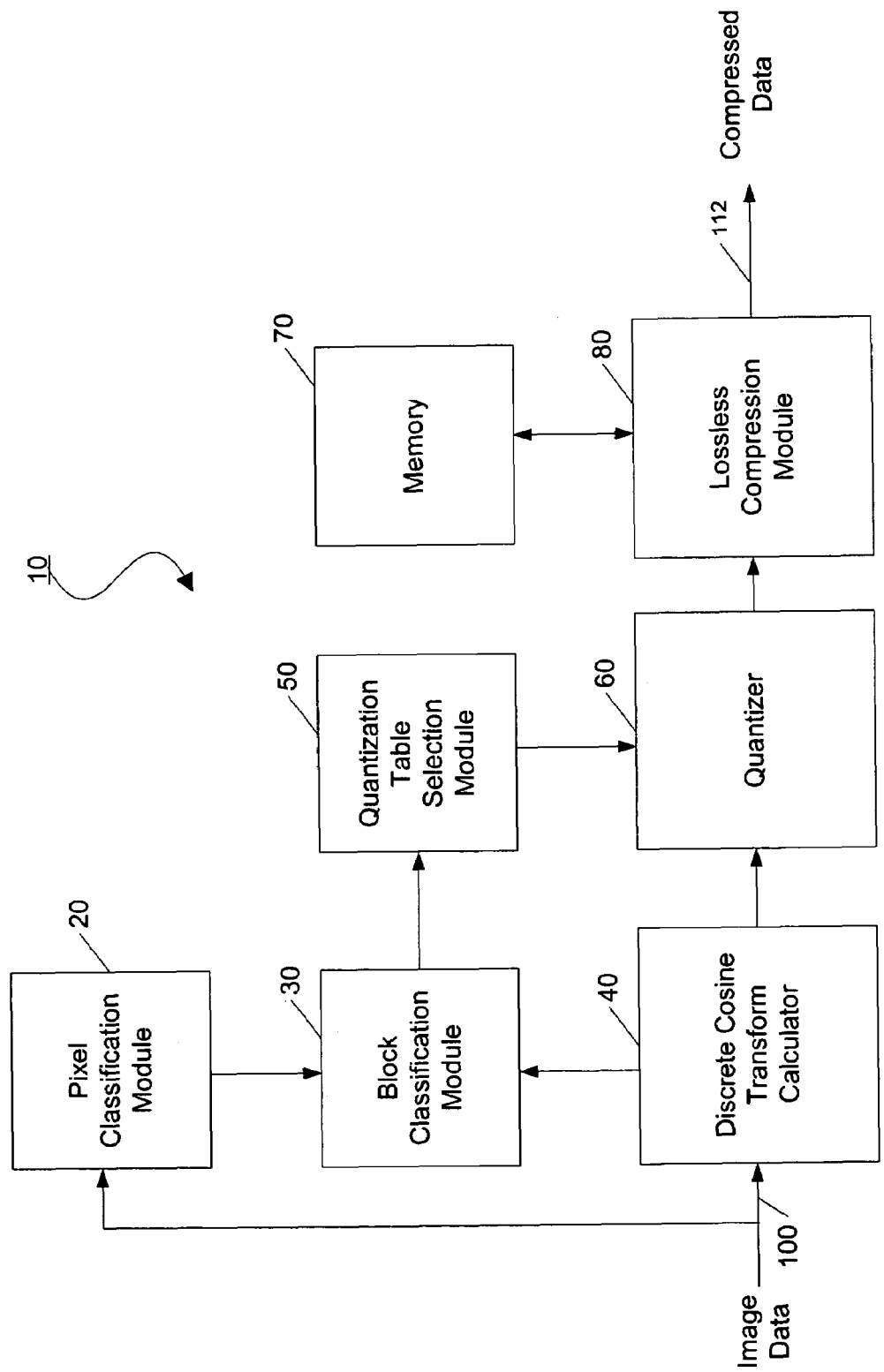
FIG. 1 illustrates a system for JPEG encoding an image.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include electrical connections or couplings, whether direct or indirect. The order of limitations specified in any method claims does not imply that the steps or acts set forth therein must be performed in that order, unless an order is explicitly set forth in the specification.

In addition, it should be understood that embodiments of the invention include both hardware and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software. As such, it should be noted that a plurality of hardware and software based devices, as well as a plurality of different structural components may be utilized to implement the invention. Furthermore, and as described in subsequent paragraphs, the specific mechanical configurations illustrated in the drawings are intended to exemplify embodiments of the invention and that other alternative mechanical configurations are possible.

Referring to FIG. 1, a system 10 for JPEG encoding an image is illustrated. System 10 includes a pixel classification module 20, a block classification module 30, a discrete cosine transform calculator 40, a quantization table selection module 50, a quantizer 60, memory 70 for storing Huffman codes, and a lossless compression module 80. Image data is input to system 10 via input 100 and compressed output data at port 112 can be stored, for example, in a memory (not shown).

In one embodiment, the image data input to system 10 may represent an image of size 512 by 512 pixels and include an eight bit gray scale value for each pixel. Clearly, image data of various sizes can be input to system 10; the image data can also represent color images. Color images would typically be represented as three different image files, each one being separately processed.

Figure 2:
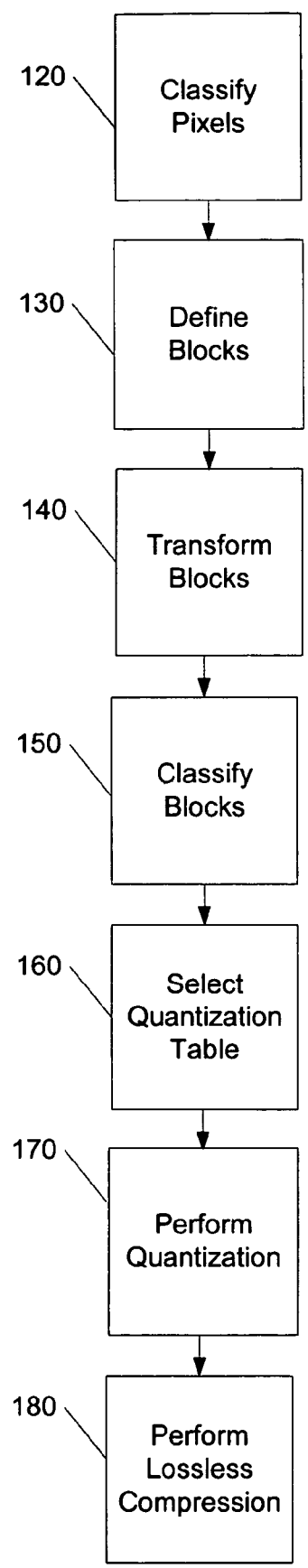
FIG. 2 illustrates a flow chart for JPEG encoding an image according to the invention.

Method steps 120-180, illustrated in FIG. 2, can be implemented in system 10. In particular, in order to JPEG encode a document image, at step 120, each pixel in the image may be classified. At step 130, image blocks may be defined, and the blocks may be transformed using a DCT at step 140. At step 150, each block in the image may be classified. At step 160, a quantization table for each block may be selected and at step 170 the coefficients of each transformed block may be quantized using the selected quantization table. At step 180, lossless compression may be performed on the quantized coefficients. The steps need not be performed in the order shown.

More specifically, step 120 operates to classify each pixel in the image as one of a plurality of pixel classifications. For example, the pixels can be classified into classifications that may include text, picture, and background. Other pixel classifications can be envisioned as well. In one embodiment, the pixels may be classified into as either text or picture.

Each pixel can be classified based on an analysis of neighboring pixels. For example, a feature vector X can be developed which condenses the description of relevant properties of each pixel in the image into a small, Euclidean feature space. The number and type of elements included in the feature vector can be selected based on the complexity of the image. For example, the elements of the feature vector may include gray values, gray values obtained through different optical filters, texture measures, Markov random field features, fractal dimension measures, and gradient magnitudes and directions. In other words, the elements for a given pixel typically provide a measure of change occurring in the image at that pixel based on image data analyzed from neighboring pixels. As used herein, neighboring pixels are not limited to just pixels that are immediately adjacent to a given pixel but can include more pixels.

In one embodiment, the feature vector can be defined to include data relating to directional edge measures. In particular, the feature vector X may be defined to include two elements: E1 and E2, defined by:

$$E1(x,y) = \|I(x,y+1) - I(x,y-1)\|$$

$$E2(x,y) = \|I(x+1,y) - I(x-1,y)\|$$

where I(x, y) is the gray level at pixel location (x, y).

An analysis of the feature vector can be performed to pre-classify specific pixels meeting a certain preselected criterion. Further, a clustering analysis may be performed that examines the distance between pre-classified specific pixels to aid in the classification of pixels.

In one embodiment, the norm, η, of the feature vector can be calculated as follows:

$$\eta = \sqrt{\sum_{i=1}^{m} E_i^2}$$

where {Ei|i=1, 2, ... m} are the elements of vector X, and m is the number of features in this vector.

The pre-classification of specific pixels can then be based on the magnitude of the norm of the feature vector. Because the elements chosen to be included in the feature vector are those that exploit contrast between neighboring pixels, a higher magnitude of the norm suggests a high contrast between a particular pixel and its neighbors. This can be considered an indication of the presence of a text element.

Thus, in one embodiment, a given pixel may be identified as a Potential Text Element (PTE) if the norm η of the feature vector is greater than a predetermined threshold, T.

The clustering analysis may then examine the spatial distance between consecutive PTEs. Because text characters are usually small in size, the spatial distance, d, between two consecutive PTEs should also be small. The addition of this clustering analysis may increase the robustness of the method against noise.

In one embodiment, if the spatial distance d between consecutive PTEs (as determined from a left to right, top to bottom order processing of the pixels) is less than a predetermined threshold D, then the two PTEs and all pixels in between may also be classified as text. Otherwise, the two PTEs and all pixels in between may be classified as pictures, as are the remaining pixels that haven't been classified as text.

The image may be divided into blocks at step 130. The blocks can be of size 8 by 8 pixels, according to the JPEG standard.

At step 150, the blocks are classified as one of a plurality of block classifications. The plurality of block classifications defined can vary and may include text, picture and background, yet need not be identical to the plurality of pixel classifications used to classify the pixels. In one embodiment, the block classifications may include text and picture. In another embodiment, the block classifications may include text, picture and mixed. The category "mixed" refers to pixels which do not match closely with either text or picture. Various other block classifications can also be envisioned. In one embodiment, if the total number of pixels classified as text in the block exceeds a predefined threshold D, then the block may be classified as text. If the total number of pixels classified as text in the block does not exceed the predetermined threshold D, then the block may be considered to be picture.

In another embodiment, the block classifications may be the same as the pixel classifications, and the predominant classification of pixels in the block may determine the block classification. Various other block classification schemes can also be used.

At step 140, the blocks may be transformed using a DCT. The DCT calculator operates to transform each block of image data to the spatial frequency domain. In one embodiment, each pixel of the image data may be represented by an 8 bit gray scale value. As each block is transformed, a transform block of size 8 by 8 is produced. In one embodiment, the 64 coefficients in the transform block are each 11 bits.

At step 160, a quantization table may be selected based on the classification of the block. This allows a variable quantization to be applied in order to compress text areas such that the decompressed image has a desirable perceptual quality (i.e., it is not significantly degraded).

For example, a quantization matrix having size 8 by 8 can be defined that includes the following entries:

$$Q(i,j)=1+((1+i+j)/(QF))$$

where i, j define the row and column position, respectively, in the table and QF is a quality factor.

For a quality factor of ½, the quantization table can look like:

| 3 | 5 | 7 | 9 | 11 | 13 | 15 | 17 |
|---|---|---|---|----|----|----|----|
| 5 | 7 | 9 | 11 | 13 | 15 | 17 | 19 |
| 7 | 9 | 11 | 13 | 15 | 17 | 19 | 21 |
| 9 | 11 | 13 | 15 | 17 | 19 | 21 | 23 |
| 11 | 13 | 15 | 17 | 19 | 21 | 23 | 25 |
| 13 | 15 | 17 | 19 | 21 | 23 | 25 | 27 |
| 15 | 17 | 19 | 21 | 23 | 25 | 27 | 29 |
| 17 | 19 | 21 | 23 | 25 | 27 | 29 | 31 |

Similarly, for a quality factor of ⅕, the quantization table can look like:

| 6 | 11 | 16 | 21 | 26 | 31 | 36 | 41 |
|---|----|----|----|----|----|----|----|
| 11 | 16 | 21 | 26 | 31 | 36 | 41 | 46 |
| 16 | 21 | 26 | 31 | 36 | 41 | 46 | 51 |
| 21 | 26 | 31 | 36 | 41 | 46 | 51 | 56 |
| 26 | 31 | 36 | 41 | 46 | 51 | 56 | 61 |
| 31 | 36 | 41 | 46 | 51 | 56 | 61 | 66 |
| 36 | 41 | 46 | 51 | 56 | 61 | 66 | 71 |
| 41 | 46 | 51 | 56 | 61 | 66 | 71 | 76 |

In one embodiment, with the block classifications being picture and text, if the block is classified as picture, then a quantization table having a quality factor of ⅕ may be selected, and if the block is classified as text, then a quantization table having a quality factor of ½ may be selected.

Quantization is the process that reduces the number of bits needed to store a value in the DCT transform block by reducing the precision of the value stored. Generally, the precision of the coefficients can be reduced according to their location in the transform block. In other words, the farther away from the origin (0,0) an element is, the less it contributes to the image, and the less important it is to maintain rigorous precision in its value.

The JPEG algorithm may implement quantization using a quantization table or matrix. For every element position in the transform block, there may be a corresponding quantum value in the quantization matrix. The quantum value may indicate the step size that will be used for that element in the compressed rendition of the image.

In one embodiment, the quantization step may produce a table having size 8 by 8 wherein each element of the table may be calculated by dividing the coefficient in the transform block by the corresponding quantum value in the quantization table, and rounding to the nearest integer. Specifically:

$$\text{Quantized Value}(i,j)=\text{Round}[DCT\ \text{coefficient}(i,j)/\text{Quantum}(i,j)]$$

The final step in the JPEG process may be coding the quantized images. This phase may include changing the DC coefficient at i=0 and j=0 from an absolute value to a relative value. The coefficients of the image may also be arranged in a zigzag sequence. Zero values may then run length encoded, and nonzero values may use Huffman codes or arithmetic coding, as is known in the art.

The elements of system 10 can be implemented as software or dedicated hardware.

Various features and advantages of the invention are set forth in the following claims.

What is claimed is:

1. A system for encoding an image comprising:
   a pixel classification module for classifying each pixel of the image as one of a plurality of pixel classifications;
   a transform calculator for defining the image as a plurality of blocks of pixels and transforming each block to produce transform coefficients for the block;
   a block classification module for classifying each block as one of a plurality of block classifications based on the pixel classifications of pixels in the block;
   a quantization table selector unit operating to select, for each block, a quantization table according to the block classification for that block; and
   a quantizer for quantizing the transformed coefficients for each block using the selected quantization table for that block.

2. The system of claim 1, wherein the transform calculator uses discrete cosine transforms.

3. The system of claim 1, wherein a JPEG-compliant encoding is performed.

4. The system of claim 1, wherein the pixel classification module classifies each pixel as one of text and picture.

5. The system of claim 1, wherein the pixel classification module classifies each pixel as one of text, picture and background.

6. The system of claim 1, wherein the pixel classification module computes a vector having elements representing comparisons between neighboring pixels.

7. The system of claim 6, wherein the vector includes elements representing comparisons of pixel values between adjacent pixel locations.

8. The system of claim 6, wherein the pixel classification module computes a norm for the vector and classifies the pixel based on the value of the norm.

9. The system of claim 6, wherein the pixel classification module computes a norm for the vector, defines the pixel as a potential text element if the value of the norm is above a first threshold, and classifies the potential text element as text if the distance between it and the closest potential text element is less than a second threshold.

10. The system of claim 6, wherein a first element of the vector corresponds to a difference in gray values of pixels horizontally adjacent to the given pixel and a second element of the vector corresponds to a difference in gray values of pixels vertically adjacent to the given pixel.

11. The system of claim 1, wherein the plurality of block classifications includes text and picture.

12. The system of claim 1, wherein the plurality of block classifications includes text, picture and mixed.

13. A method for encoding an image comprising the steps of:
   classifying each pixel of the image as one of a plurality of pixel classifications;
   defining the image as a plurality of blocks of pixels;
   transforming each block to produce transform coefficients for the block;
   classifying each block as one of a plurality of block classifications based on the pixel classifications of pixels in the block;
   selecting a quantization table for each block according to its block classification; and
   quantizing the transform coefficients for each block using the selected quantization table for that block.

14. The method of claim 13, wherein the plurality of pixel classifications include text and picture.

15. The method of claim 13, wherein the plurality of pixel classifications include text, picture and background.

16. The method of claim 13, wherein the step of classifying each pixel includes computing a vector having elements representing comparisons between neighboring pixels.

17. The method of claim 16, wherein the step of classifying each pixel includes computing a vector having elements representing comparisons of gray values between adjacent pixels.

18. The method of claim 16, wherein the step of classifying each pixel further includes computing a norm for the vector, and classifying the pixel based on the value of the norm.

19. The method of claim 16, wherein the step of classifying each pixel further includes computing a norm for the vector, defining the pixel as a potential text element if the value of the norm is above a first threshold, and classifying the pixel as text if the distance between it and the closest potential text element is less than a second threshold.

20. The method of claim 16, wherein a first element of the vector corresponds to a difference in the gray values of pixels horizontally adjacent to the given pixel and a second element of the vector corresponds to a difference in the gray values of pixels vertically adjacent to the given pixel.

21. The method of claim 13, wherein the plurality of block classifications includes text and picture.

22. The method of claim 13, wherein the plurality of block classifications includes text, picture and mixed.

* * * * *